United States Patent
Lin-Hendel

(10) Patent No.: US 9,870,587 B2
(45) Date of Patent: *Jan. 16, 2018

(54) SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

(71) Applicant: Catherine G. Lin-Hendel, Summit, NJ (US)

(72) Inventor: Catherine G. Lin-Hendel, Summit, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/583,361

(22) Filed: May 1, 2017

(65) Prior Publication Data

US 2017/0236198 A1    Aug. 17, 2017

Related U.S. Application Data

(63) Continuation of application No. 14/847,257, filed on Sep. 8, 2015, now Pat. No. 9,704,193, which is a
(Continued)

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06F 3/0482* (2013.01); *G06Q 30/0623* (2013.01); *G06Q 30/08* (2013.01)

(58) Field of Classification Search
CPC .................................................. G06Q 30/00
(Continued)

(56) References Cited

U.S. PATENT DOCUMENTS

| 5,485,174 A * | 1/1996 | Henshaw | G06F 3/0485 345/684 |
| 5,621,430 A * | 4/1997 | Bricklin | G06F 3/0481 345/686 |

(Continued)

OTHER PUBLICATIONS

BW: "Skoda Goes 3D on the Web with Superscape www.skoda-auto.cz," Business Wire, Jul. 6, 1998; Proquest #31434077, 3pgs.*

*Primary Examiner* — Rob Pond
(74) *Attorney, Agent, or Firm* — Douglas L. Weller

(57) ABSTRACT

A virtual reality scene corresponding to a physical scene is displayed. The virtual reality scene includes a plurality of objects. The plurality of objects is selectable by a user and is built from a plurality of images representing varied views of the plurality of objects in the physical scene. The user is enabled to navigate within the virtual reality scene to observe the virtual reality scene from at least two perspectives. The user is enabled to rotate at least one of the plurality of objects within the virtual reality scene about at least one axis. A selection received from the user corresponds to at least one of the plurality of objects within the virtual reality scene. In response to the selection, additional information about a selected at least one of the plurality of objects is displayed. The additional information includes at least one of a link to buy and a link to bid on the selected at least one of the plurality of objects.

20 Claims, 17 Drawing Sheets

Related U.S. Application Data continuation of application No. 14/284,149, filed on May 21, 2014, now Pat. No. 9,135,654, which is a continuation of application No. 13/853,788, filed on Mar. 29, 2013, now Pat. No. 8,903,738, which is a continuation of application No. 13/037,356, filed on Feb. 28, 2011, now Pat. No. 8,433,616, which is a continuation of application No. 12/507,000, filed on Jul. 21, 2009, now Pat. No. 7,899,719, which is a continuation of application No. 09/631,238, filed on Aug. 2, 2000, now Pat. No. 7,574,381.

(60) Provisional application No. 60/147,716, filed on Aug. 6, 1999.

(51) Int. Cl.
   *G06Q 30/08* (2012.01)
   *G06F 3/0482* (2013.01)

(58) Field of Classification Search
   USPC .................................................... 705/26, 27
   See application file for complete search history.

(56) References Cited

U.S. PATENT DOCUMENTS

| | | | | |
|---|---|---|---|---|
| 5,689,284 A * | 11/1997 | Herget | .................. | G06F 3/0485 345/661 |
| 5,749,082 A * | 5/1998 | Sasaki | .................... | G09G 5/343 345/685 |
| 5,793,365 A * | 8/1998 | Tang | ....................... | G06Q 10/10 715/758 |
| 5,835,896 A * | 11/1998 | Fisher | .................... | G06Q 40/04 705/26.3 |
| 5,874,936 A * | 2/1999 | Berstis | .................. | G06F 3/0481 715/785 |
| 5,877,761 A * | 3/1999 | Shoji | ........................ | G06F 9/465 345/684 |
| 5,890,138 A * | 3/1999 | Godin | .................... | G06Q 20/04 705/26.3 |
| 5,892,498 A * | 4/1999 | Marshall | ............ | H04N 5/44543 345/684 |
| 5,905,973 A * | 5/1999 | Yonezawa | ........... | G06F 3/04812 705/26.8 |
| 5,954,640 A * | 9/1999 | Szabo | ................. | G06F 19/3475 128/921 |
| 5,966,122 A * | 10/1999 | Itoh | ..................... | G06F 3/04845 348/239 |
| 5,970,471 A * | 10/1999 | Hill | ........................ | G06Q 30/02 705/26.8 |
| 5,974,398 A * | 10/1999 | Hanson | .................. | G06Q 30/02 379/88.2 |
| 6,016,494 A * | 1/2000 | Isensee | ............ | G06F 17/30873 707/726 |
| 6,026,376 A * | 2/2000 | Kenney | .................. | G06Q 30/06 705/26.61 |
| 6,058,379 A * | 5/2000 | Odom | .................... | G06Q 20/10 705/37 |
| 6,147,683 A * | 11/2000 | Martinez | ............. | G06F 3/04855 715/786 |
| 6,167,382 A * | 12/2000 | Sparks | ............... | G06Q 30/0277 705/14.73 |
| 6,188,398 B1 * | 2/2001 | Collins-Rector | ...... | G06Q 30/02 348/E5.104 |
| 6,208,770 B1 * | 3/2001 | Gilman | ............. | H04N 1/32112 345/600 |
| 6,211,874 B1 * | 4/2001 | Himmel | ........... | G06F 17/30905 707/E17.121 |
| 6,212,536 B1 * | 4/2001 | Klassen | .............. | G06F 17/3089 707/E17.116 |
| 6,215,490 B1 * | 4/2001 | Kaply | .................... | G06F 3/0481 715/788 |
| 6,222,541 B1 * | 4/2001 | Bates | .................... | G06F 3/0481 715/786 |
| 6,249,773 B1 * | 6/2001 | Allard | .................... | G06Q 30/06 705/26.8 |
| 6,264,104 B1 * | 7/2001 | Jenkins | ................ | G06Q 10/087 235/379 |
| 6,300,947 B1 * | 10/2001 | Kanevsky | ......... | G06F 17/30905 707/E17.121 |
| 6,313,854 B1 * | 11/2001 | Gibson | ................ | G06F 9/4443 715/746 |
| 6,321,991 B1 * | 11/2001 | Knowles | ........... | G06F 17/30879 235/375 |
| 6,330,575 B1 * | 12/2001 | Moore | ............... | G06Q 30/0603 707/E17.116 |
| 6,331,858 B2 * | 12/2001 | Fisher | ................ | G06Q 30/0641 345/582 |
| 6,334,145 B1 * | 12/2001 | Adams | ............. | G06F 17/30884 345/650 |
| 6,345,764 B1 * | 2/2002 | Knowles | ........... | G06F 17/30879 235/375 |
| 6,360,205 B1 * | 3/2002 | Iyengar | .................. | G06Q 10/02 705/5 |
| 6,363,419 B1 * | 3/2002 | Martin, Jr. | ............. | G06Q 30/02 709/219 |
| 6,369,811 B1 * | 4/2002 | Graham | ................ | G06F 3/0481 358/1.18 |
| 6,457,026 B1 * | 9/2002 | Graham | ........... | G06F 17/30017 707/999.003 |
| 6,462,752 B1 * | 10/2002 | Ma | ........................ | G06F 3/0485 345/684 |
| 6,480,197 B1 * | 11/2002 | Bluthgen | ............... | B01D 33/11 345/169 |
| 6,513,035 B1 * | 1/2003 | Tanaka | ............. | G06F 17/30265 |
| 6,538,698 B1 * | 3/2003 | Anderson | ............. | H04N 5/772 348/231.2 |
| 6,580,441 B2 * | 6/2003 | Schileru-Key | ...... | G06F 3/04815 705/27.1 |
| 6,912,694 B1 * | 6/2005 | Harrison | ............... | G06F 3/0485 715/784 |
| 6,940,488 B1 * | 9/2005 | Siddiqui | ............... | G06F 3/0312 345/163 |
| 7,409,643 B2 * | 8/2008 | Daughtrey | ........... | G06Q 10/025 705/5 |
| 7,418,483 B2 * | 8/2008 | Hess | .................... | G06F 12/0223 707/E17.116 |
| 2003/0083957 A1 * | 5/2003 | Olefson | ............. | G06Q 30/0643 705/27.2 |

\* cited by examiner attEntION dELiAs*cOm is an online store. If you're under 18 you'll need your parents' permission to order merchandise online.
If you're under 16 you'll also need your parents' permission to submit personal information on the site.
Get permission.
Then wear what you want.

( cOnTinuE )

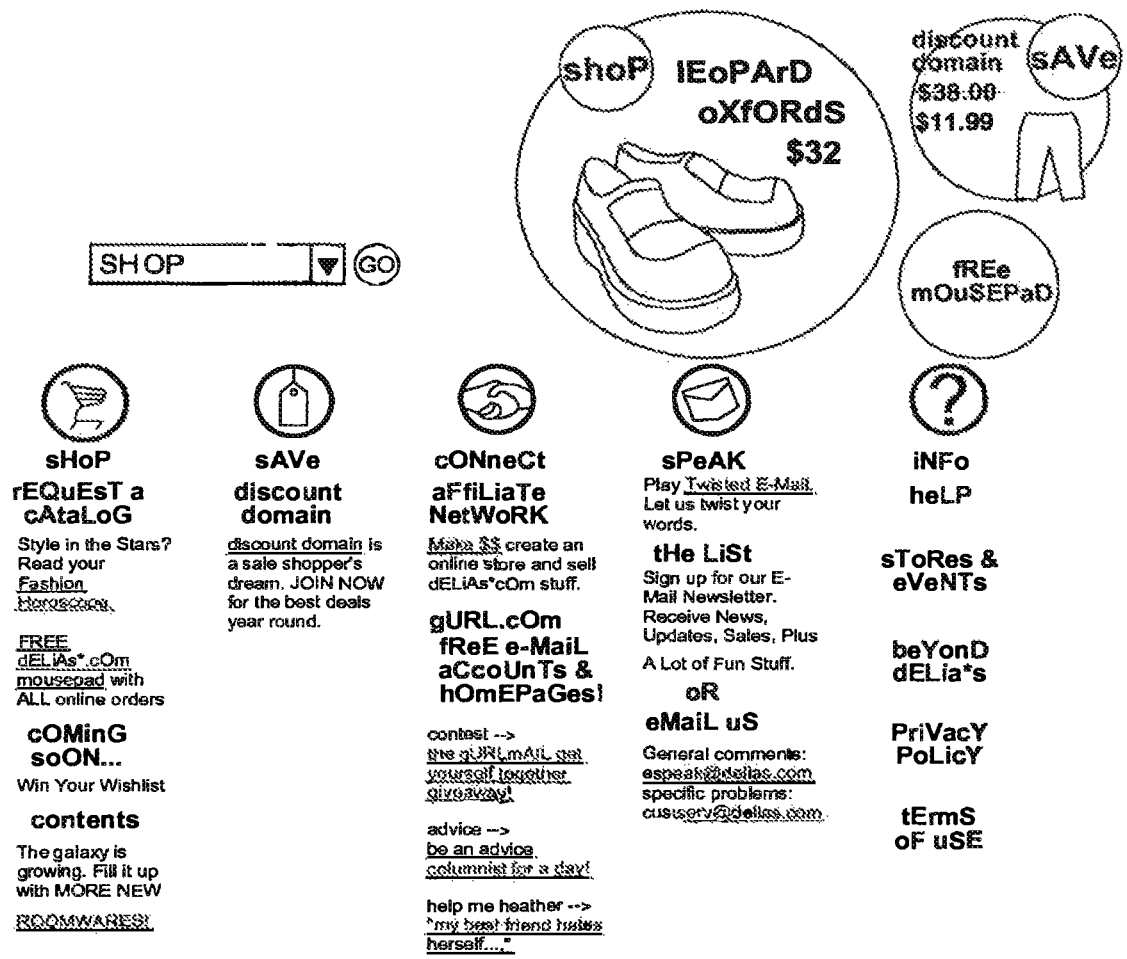
Prior Art
FIG. 1C.1

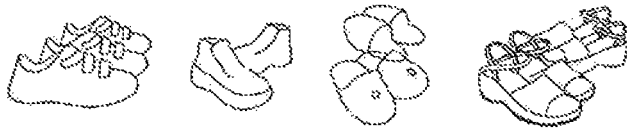
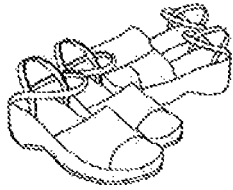
PRICE: $34.00
CARLA SHOES Satin platform wedge shoes with sequined stitching along covered platforms and toe straps. Ankle straps with metal buckle closures. Synthetic uppers and soles. By dELiA*s. Colors: black, light blue. Women's whole and half sizes: 5-9, 10, 11. 1" platforms, 3" heels. Imported.
Shoes
▶ Sneakers
▶ boots
▶ casual
▼ dressy
   Carla Shoes
Prior Art
*FIG. 1C2* artnet.com®    ART SEARCH ENGINE [_____▼] [search]

home |    | artists | auctions | printshow | bookstore | magazine

MORE

IN ARTNET
MAGAZINE

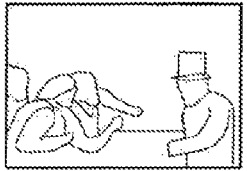

IN AUCTIONS:

*Arguing the Point*
*(detail)*
*Harry Roseland*
oil on canvas
22 x 28 in.
Est. 10,000-15,000 USD

GO TO
AUCTIONS

FEATURED LOTS:

Ansel Adams
Winter Sunrise, The Sierra
Nevada...; 1944
Est. $7,500-9,000 USD

Arman
Waiting To Exhale; 1997
Est. $4,000-5,000 USD

*Dennis Oppenheim*
Search for Clues (Silver); 1976
Est. $300-400 USD

*George Zimbel*
Marilyn Monroe on the Set of
The...; 1954
Est. $700-1,000 USD

*Margaret Jordan Patterson*
The Swans; c. 1915
Est. $1,400-1,800 USD

Roy Lichtenstein
Reflections on Minerva; 1990
Est. $13,000-15,000 USD

Andre Kertesz
Puddle New York; 1967
Est. $1,500-2,000 USD

*Keith Haring*
The Golden Child; 1986
Est. $8,000-9,000 USD

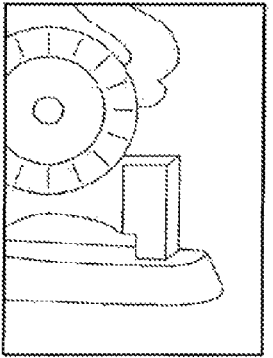

IN ANTIQUES:

Derek Roberts Fine
*Antique Clocks,*
*Tonbridge, England*
Two Train Skeleton
Clock Based on
Brighton Pavillion, c.
1860 (detail)

NEW GALLERIES:

*Artemis Fine Arts Inc.*, New
York.
*B & D Studio Contemporanea,*
Milan.
*Joan Barist Primitive Art,* New
York.
*Bernabe Somoza Gallery,*
Houston
*C.G. Boerner, Inc.*, New York
*The Bradford Trust,* Cape Cod
*Brock Gallery,* Action
*Galerie Camille Burgi,* Paris
Galeria Monica De Cardenas,
Milan
*Galerie Eric Costalem,* Paris
Gian Ferrari Arte
*Contemporanea,* Milan
*Frank H. Hogan Fine Arts, Inc.*,
Orleans
Indigo, Frankfurt
*Mercury Gallery,* Boston
*Meyerovich Gallery,* San
Francisco
*Miller Block Gallery,* Boston
*Muse [X] Editions,* Los

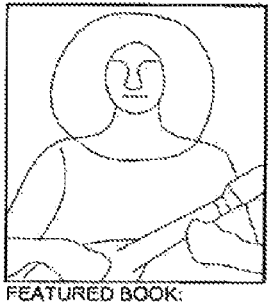

FEATURED BOOK:

*Pre-Raphaelite*
*Women Artists*
*by Jan Marsh and*
Pamela G. Nunn
Published to accompany an
exhibition in Manchester,
England, this catalogue brings
together paintings, drawings,
photographs, and other works
that women artists contributed
to the Pre-Raphaelite
movement.

NEW RELEASES:

David Hockney: Prints 1954-
1995 The only available print
catalogue raisonne, published
in Japan.

Edward Ruscha: Editions 1962-
1999 The much anticipated
catalogue raisonne of the
artist's print projects.

1999 Venice Biennale
Catalogue The spectacular two-
volume catalogue of the 48th
Venice International Exhibition
of Contemporary Art.

Jean-Michel Basquiat: Works
on Paper The new catalogue
raisonne from Galerie Enrico
Navarra.

Art 20: The Thames and
Hudson Multimedia Dictionary
of Modern Art An invaluable

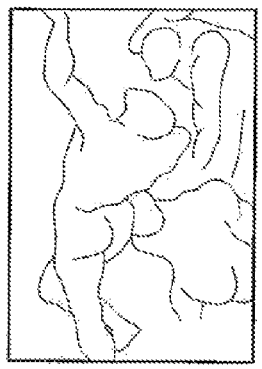

Peter Paul Rubens,
*Anatomical Studies: Three*
*Nudes, at Christie's*

OLD MASTER
REPORT
by Paul Jeromack
Summer sales in London, plus
Feigen finds Fra Angelico.

MY EYE
by Thomas Hoving
*Art for Dummies and "The*
*American Century."*

DESIGN'S HIP
ICONOCLAST
by Stanley
Abercrombie
The late Tibor Kalman at the
San Francisco MoMA

 Sponsored by Herman
Miller Furniture

GARRETT'S ATTIC
by Wendell Garrett

Prior Art
*FIG. 1D1*

Man Ray
Angers, 1930
Est. $6,000-8,000 USD

Mimmo Paladino
Untitled; 1985
Est. $25,000-30,000 USD

Donald Sultan
Untitled, July23, 1977
Est. $10,000-$12,000 USD

Jane Peterson
Mont St. Michel
Est. $5,000-7,000 USD

Edward Weston
Oceano, 1936; printed 1970's
Est. $2,000-3,000 USD

Karl Blossfeld
Untitled, Gravures from Unformen...;c. 1929
Est. $300-400 USD

Berenice Abbott
Flatiron Building, New York; 1938, printed c. 1970's
Est. $3,500-4,500 USD Angeles.
Nike Fine Arts Gallery, New York.
Parkett Editions, New York
S.J. Phillips Ltd., London.
Maya Polsky Gallery, Chicago.
Derek Roberts Fine Antique Clocks, Tonbridge.
Leslie Sacks Fine Arts, Los Angeles.
Salomon Stodel Antiques, Amsterdam.
Saggarah Fine Arts, Monaco.
Christopher Selser, Santa Fe.
Galeria Tini Tapies, Barcelona.
Shoshana Wayne Gallery, Santa Monica.
Westland & Company, London.
XL Gallery, Moscow.

Are you selling art online...We are...click for testimonials.

and Macintosh.

Serge Pollakoff; Catalogue Raisonne of the Prints An exquisite production, edited by the artist's son Alexis.

Cezanne to Van Gogh: The Collection of Doctor Gachet The first comprehensive overview of the original collection, currently on view at the Metropolitan Museum of Art.

Lucio Fontana: Catalogue Rome A retrospective on the occasion or the artist's centenary celebration.

Chagall: Lithographs A new catalogue raisonne.

Sea Change: The Seascape in Contemporary Photography Now on view at the International Center of Photography, New York.

room chairs for the William H. Vanderbilt Mansion in New York City.

Sponsored by
GEORG JENSEN  THE SILVER FUND LIMITED
The world's leading specialists in Georg Jensen silver.

SIGN UP ▶ yourname@artnet.com
LOGIN ▶ FREE EMAIL FROM ARTNET.COM

SUBSCRIBE TO THE artnet.com
email auction alert site map member services resources dialogue about us add a site to the art search engine

©1999 artnet.com. All rights reserved. Artnet.com is a registered trademark of the ArtNet Worldwide Corporation, New York, NY.
Terms and Conditions

Prior Art
*FIG. 1D2*

| All Items in Furniture |||
|---|---|---|
| Current Auctions |||

For more items in this category, click these pages:
= 1 = 2 3 4 5 6 ... 20 ... 36 (next page)

| Item | Price | Bids | Ends PDT |
|---|---|---|---|
| MAGNIFICENT EGYPTIAN DINING ENSEMBLE | $5000.00 | - | 07/26 16:55 |
| Majorelle Armoire* | $8000.00 | - | 07/26 16:51 |
| Old Brass Ornamental Griffin Fireplace Fan | $9.99 | - | 07/23 16:51 |
| OLD HAND CRAFTED DOLL'S WARDROBE!! | $25.00 | - | 07/23 16:43 |
| MASSIVE CLAWFOOT OAK LAMP TABLE | $385.00 | - | 07/23 16:42 |
| OLD HEREKE PERSIAN Oriental Rug NiceRugs | $400.00 | - | 07/26 16:30 |
| An Encyclopedia of Desks By Mark Bridge 1988 | $9.50 | - | 07/23 16:29 |
| VICTORIAN EBONIZED/GILT INCISED SEWING BENCH | $29.99 | - | 07/21 16:29 |
| Furniture Refinishing: The Furniture Doctor | $5.00 | - | 07/23 15:58 |
| Mahogany Round Tea Table | $140.00 | - | 07/23 15:41 |
| French Style Desk | $290.00 | - | 07/26 15:32 |
| Armoire | $1500.00 | - | 07/26 15:30 |
| 1860's MAHOGANY CHEST OF DRAWS | $100.00 | - | 07/23 15:29 |
| *19thC. MAHOGANY FLAMBE 1 DRAWER STAND/TABLE* | $49.99 | - | 07/21 15:26 |
| Duncan Phyfe Pair of Lyre Mahogany Drum Table | $295.00 | - | 07/23 15:24 |
| Louis XVI Mahogany Bedroom Suit Antique | $595.00 | - | 07/23 15:10 |
| Officer's Folding Canopied Bed 1850's NICE | $250.00 | - | 07/26 15:08 |
| Glass Floor Protectors for Furniture | $3.00 | - | 07/23 15:03 |
| Antique Oak Office Chair | $25.00 | - | 07/26 15:02 |
| Old Old victorian Stand with engravings NEAT | $20.00 | - | 07/19 14:58 |
| Duncan Phyfe Mahogany Antique Sofa | $295.00 | - | 07/23 14:56 |
| STUNNING FRENCH ARMOIRE | $99.99 | - | 07/23 14:52 |
| Duncan Phyfe Mahogany Living Room Suit | $295.00 | - | 07/23 14:48 |
| Oak Rolltop Desk | $900.00 | - | 07/26 14:47 |
| * Leather Couches * tan double pillow | $100.00 | - | 07/26 14:47 |
| Duncan Phyfe Mahogany Dining Table Antique | $100.00 | - | 07/23 14:36 |
| Duncan Phyfe Mahogany Barrel Chair Antique | $75.00 | - | 07/23 14:33 | http://listings.ebay.com/aw/listings/hst/category1209/index.html       7/16/99

Prior Art

The Portal to Good Living

- Shopping
- Auctions, Sales
- Build to Order
- Personal Concierge

- Registration
- My Folder
- Listings
- search

Bon Vivre

- Communications Concierge
- Executive Web Concierge

- Articles, Magazines
- News, Events
- Chat, Forum
- Bulletin Board
- RFP, RFQ onVivre.com |

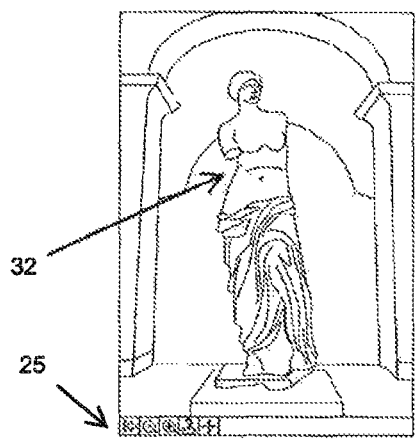

32

25

© 1998, 1999 All rights reserved. Mako communications & Computing   Phone: (408) 354-0273   Fax: (408) 354-6293
18850 Blythswood Dr., Los Gatos, CA 95030   Have a question, comment or suggestion?

*FIG. 3E*

SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

CROSS REFERENCE TO RELATED APPLICATIONS

This is a Continuation Application of U.S. patent application Ser. No. 14/847,257, U.S. Pat. No. 9,704,193, filed on Sep. 8, 2015, which is a continuation of U.S. patent application Ser. No. 14/284,149, U.S. Pat. No. 9,135,654, filed on May 21, 2014, which is a continuation of U.S. patent application Ser. No. 13/853,788, U.S. Pat. No. 8,903,738, filed on Mar. 29, 2013, which is a continuation of U.S. patent application Ser. No. 13/037,356. U.S. Pat. No. 8,433,616, filed on Feb. 28, 2011; which is a continuation application of U.S. patent application Ser. No. 12/507,000, U.S. Pat. No. 7,899,719, filed on Jul. 21, 2009; which is a continuation application of U.S. patent application Ser. No. 09/631,238, U.S. Pat. No. 7,574,381, filed Aug. 2, 2000; which claims priority to U.S. Provisional Application Ser. No. 60/147,716, filed Aug. 6, 1999. The disclosures of all the foregoing patent documents are incorporated herein by reference as if fully set forth herein, including Figures, Claims, and Tables.

BACKGROUND OF THE INVENTION

In the brick-and-mortar world, showrooms, galleries, and stores are used to display furnishing, interior accessories, fashion, art, antiques, or other objects. Shopping centers, malls, and main streets are constructed to aggregate a large number of stores. The on-line equivalent of such commerce components are constructed with database containing information for such objects or stores sorted with nesting categories. The objects in conventional cyber stores, galleries, and show rooms are represented on the client/user computer screens as index lists of textual or thumbnail entries. The stores in a conventional cybermall are represented by a collection of "banner" entries (see FIGS. 1A, 1B, 1C1, 1C2, 1D1, 1E, 1F). Thumbnails are small graphical representation of an object, serving as an index and a link to detailed information regarding the object. Banner is a small graphical box-like icon with the logo and name of a business entity on the Web Clicking on a thumbnail usually brings an enlarged photograph and/or descriptions of the object from the server database to the client/user's computer screen. Clicking on a "banner" brings the user to the home page of the business entity the banner represents.

A typical on-line gallery or store, for example, would show category titles of the gallery collections or store items, with some textual entries or graphical thumbnails of selected "featured" exhibits or items. When a particular "last stop" category on a particular categorical path is clicked, the items or objects sorted under the category are presented in an index list of textual one-line or thumbnail entries. The index could be very long, and partitioned into many web pages (each may be several print pages long), accessible on-web page-at-a-time. Clicking on a textual or thumbnail entry or brings detailed textual description and an enlarged version of the thumbnail, if available, again only one-at-a-time (see FIGS. 1A1 and 1A2).

Virtual Reality software, such as Apple Computing Quick Time, or Macromedia Flash, on the other hand, has been developed to show scrolling panoramic views of a room or a scene, or to rotate a three-dimensional object to show its 360-degree views. The Virtual Reality source data is typically prepared by shooting multiple still photographs of a room, a scene, or an object from sequentially varying angles, and re-compose the still photographs in the correct spatial-time sequence to form a contiguous panoramic view. Video filming can also be used. Viewing the Virtual Reality image at the viewer's computer screen is controlled by the "mouse," a computer input device (see FIGS. 2A, 2B, and 2C) and the control buttons on the VR "viewing window" on the computer screen. The panoramic view of a scene is scrolled across the viewing window. The still shots from sequentially varying angles of a 3-D object is "flashed" onto the VR viewing window, producing an illusion of the object rotating in the window, given a large enough number of still shots, and fast enough speed of spatial-time re-composition or "flashing."

Virtual Reality has not been used in actionable on-line or electronic commerce environment, except for viewing purposes only, such as displaying a property or a house on-line on Real-Estate listing sites as in FIGS. 2A, 2B, and 2C; or, rotating a 3-D object, such as a car on car sites; or, for other purely entertainment purposes, such as displaying the content of a museum. In all cases, the Virtual Reality graphical data packet is treated as a single data entity with a single "packet address," accessed by clicking a VR or 3D button, and viewed by controlling the temporal scanning or rotation using the control buttons on the computer screen in conjunction with the button on the input device, the mouse. From within the Virtual Reality data packet, there is no link to the external world outside the data packet. Therefore, there is no practical application other than its visual and entertainment value. One cannot do anything with the Virtual Reality presentation of the known-art, other than looking at it and enjoying it.

The present invention relates to methods and apparatus to construct and display electronic/cyber/on-line showrooms, galleries, stores and malls to emulate the physical brick and mortar world, in additional to the conventional category and index listing e-commerce construct of the Web. Virtual Reality (VR) shots and/or Video films are made to visually present a show room, gallery, store, or object with more resemblance to the physical world we live. Each still picture of the VR shots or each frame of the video film is given a unique frame address. Each significant and unique object in the VR data packet is given a unique identification, indexed and addressed by the area the object occupies in a picture or a frame. Links are associated with each such object, such that detailed information (such as graphical, video, audio, or textual descriptions) related to the objects stored external to the VR date packet, can be retrieved from the database on demand, when the objects in the VR images are "selected"/ "clicked."

BRIEF DESCRIPTION OF THE DRAWINGS

FIGS. 1B, 1C1 and 1C2 illustrate a prior art dELiAs.Com store listed under the AOL Apparel Stores.

FIGS. 1D1 and 1D2 illustrate prior art Artnet.Com Galleries.

FIG. 1E illustrates a prior art first print page of the first web-page of a 36 web-page Ebay Furniture listing.

FIG. 3D illustrates an example of data stored in memory space external to the Virtual Reality data packet, linked to the object image from within the Virtual Reality data packet.

FIG. 3E illustrates the object with control buttons at the lower left corner resulting from activation of the "Virtual Reality" button in FIG. 3D in accordance with the present invention.

DETAILED DESCRIPTION

Figure 1A:
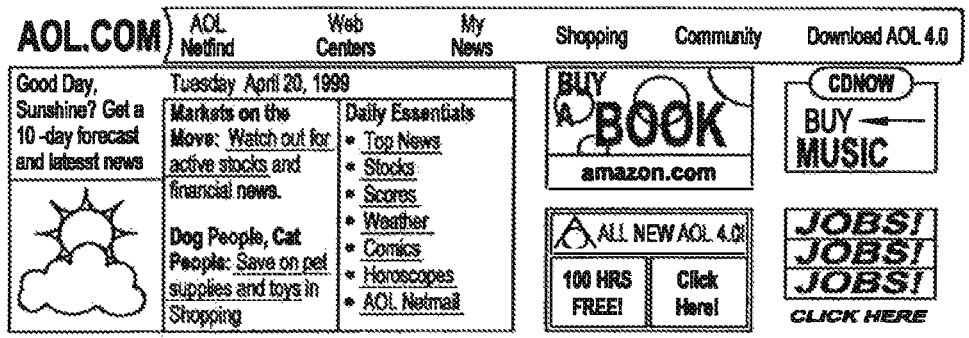
FIG. 1A illustrates prior art on-line malls, stores, galleries, and showrooms.
Figure 1B:
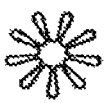
Figure 1B:
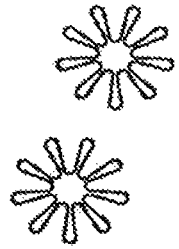
Figure 1F:
FIG. 1F illustrates a prior art Design Toscano Cyber Show Room.
Figure 2A:
FIGS. 2A, 2B and 2C illustrate prior art Virtual Reality: Virtual touring of a home displayed on the www.bamboo- .com web site. There is no other function beyond the visual tour: scrolling the panoramic image to the left, to the right, and look at it.

Referring again to prior art FIG. 2A, clicking on the "Exterior Front" selection on the menu at the left side, initiates the downloading of the "panoramic image of the exterior front view of the house from the server database, as noted under the "Bamboo.com/Virtual Tour" logo at the center of the page.

Figure 2B:
Figure 2C:

Referring again to prior art FIG. 2B, when the downloading of the panoramic image is complete, the exterior scene of the home scrolls across the "VR window" on the computer screen. The buttons on the lower left corner of the VR window are control buttons activated by the computer mouse. By moving the cursor to the "left" arrow, and pressing down Referring now to prior art FIG. 2C, clicking on the "Master Bedroom" selection on the menu at the left side of the page, causes the "panoramic" image of the master bedroom, to download from the site-server to the client/user's computer screen. The scrolling and stopping functions are identical to those in FIG. 2B.

The present invention relates to methods and apparatus to construct and display electronic/cyber/on-line showrooms, galleries, stores and malls to emulate the physical showrooms, galleries, stores, and malls. Virtual Reality (VR) shots with audio segments, and/or Video films are made to visually, audibly, and contiguously present a show room, gallery, store, or object. Each still picture 32A of the VR shots or each frame 30a, 30b, 30c, 30d, 30e, 30f, 30g, 30h, and 30i of the video film is given a unique frame address within the VR packet address. Thus, each picture 32A or each frame 30a, 30b, 30c, 30d, 30e, 30f, 30g, 30h, and 30i is identifiable via the address of the packet and the address of the frame 30a, 30b, 30c, 30d, 30e, 30f, 30g, 30h, and 30i. Each significant and unique object 32 in the VR data packet, is given an unique identification, indexed by the area 50 the unique object 32 occupies in the frames 30a, 30b, 30c, 30d, 30e, 30f, 30g, 30h, and 30i or pictures 32A containing the object. Links are assigned to that unique object 32, which may appear in multiple frames, such that detailed information (such as graphical, VR, video, audio, or textual descriptions) related to the object 32 addressed by the links, can be retrieved from the database external to the VR data packet, on demand, such as when the object 32 in the proximity frames is "clicked," from any of the proximity frames.

Clicking on a particular object 32 in a frame 30a, 30b, 30c, 30d, 30e, 30f, 30g, 30h, and 30i, or in any of the proximity frames 30b, 30c, 30d, 30e, 30f, 30g, and 30h in a VR presentation of a show room, gallery, or store, would select the link/links associated with the particular object 32 clicked, and store the links in a file on the client/use computer. Multiple objects can be "clicked,"—i.e., selected, within a VR presentation. When the viewing and the selection process is completed, and the collection of "clicked" links is submitted to the server, by clicking a "submit" button, all data, whether video, audio, VR, graphics, or textual, addressed by the links submitted are brought from the server database to the client/user/user computer with reference to each selected object.

Figure 3A:
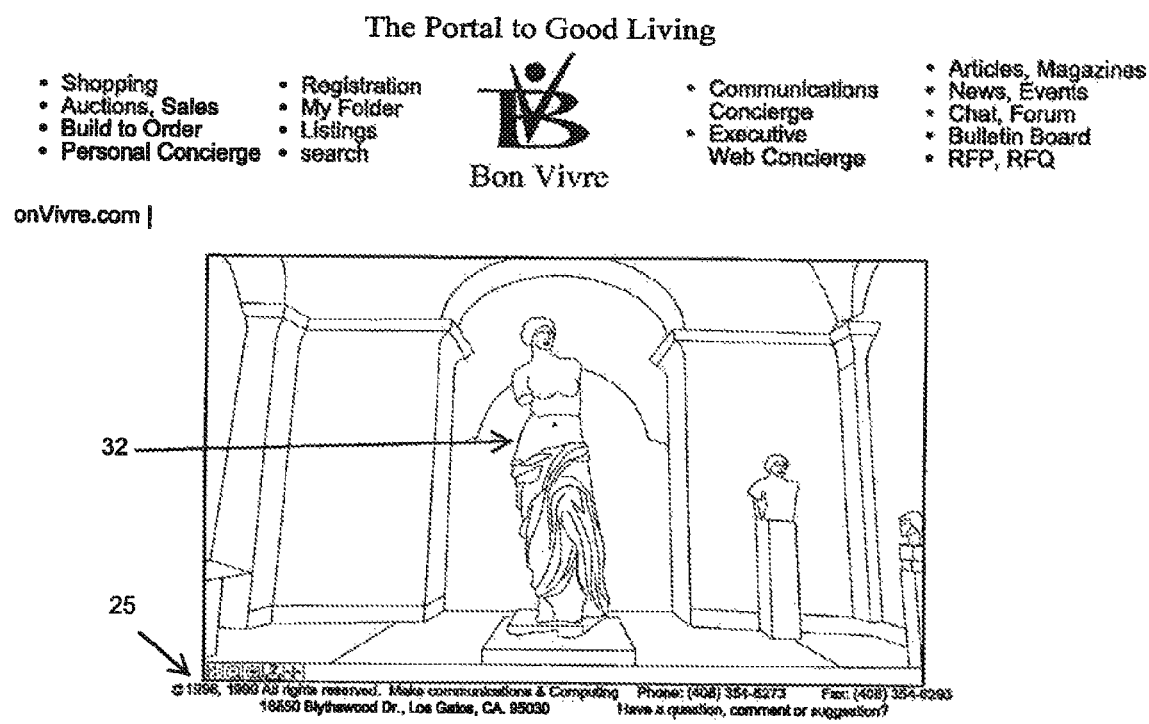
FIG. 3A illustrates a central scene and the primary object of a Virtual Reality presentation of a museum hall with small buttons at the lower left corner to scroll the panoramic scene of the Hall to the left, right, up, down and zoom-in and pan-out.
Figure 3B:
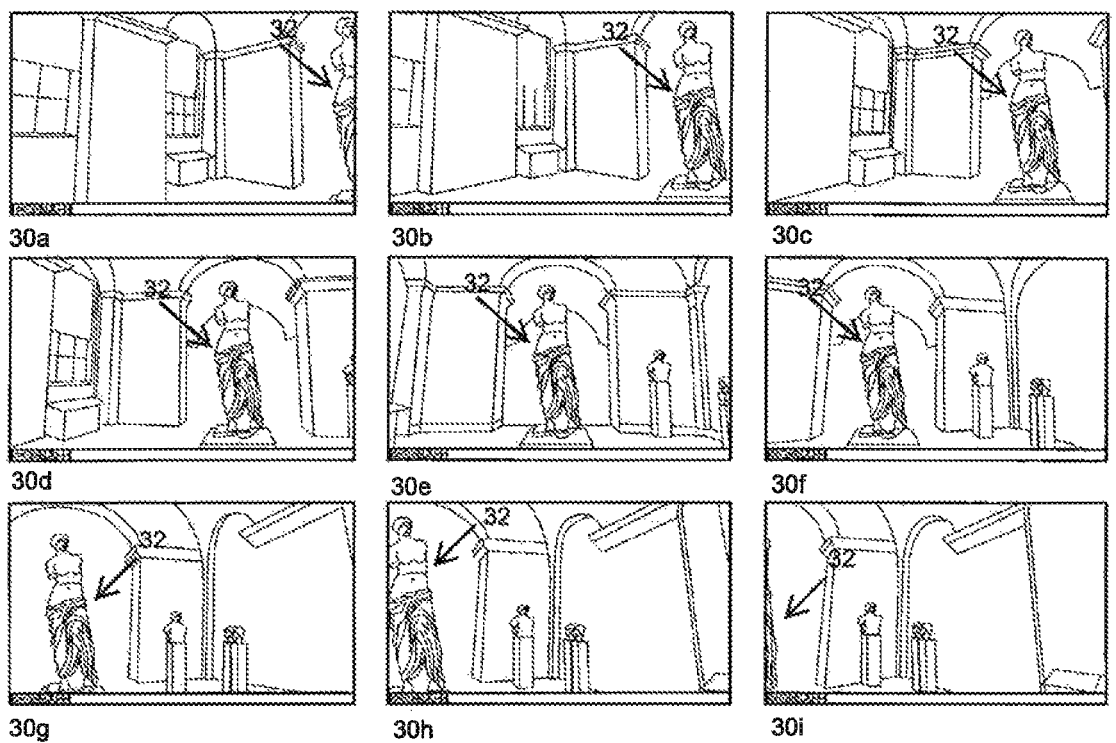
FIG. 3B illustrates nine Virtual Reality frames around the central object in the hall, scanning from the left of the object through the object, to the right of the object, each assigned its unique frame identity in the present invention.

FIG. 3A shows the central scene about a primary object 32, Venus of Milo of a Virtual Reality presentation of a museum hall. The small buttons 25 at the lower left corner scrolls the panoramic scene of the Hall to the left, right, up, down, and zoom-in and pan-out. A selected set of nine frames 30a, 30b, 30c, 30d, 30e, 30f, 30g, 30h, and 30i around the primary object 32 in this example, are shown in FIG. 3B. The limit of the conventional Virtual Reality of the known-art is here. There is no interaction or linking mechanism from inside the Virtual Reality images, such as these frames, to data outside of the VR packet. In FIG. 3B, there are nine Virtual Reality frames 30a, 30b, 30c, 30d, 30d, 30f, 30g, 30h, and 30i around the primary object 32 in the hall, scanning from the left of the object through the object, to the right of the object, each assigned its unique frame identity in the present invention.

In our implementation, each frame 30a, 30b, 30c, 30d, 30e, 30f, 30g, 30h, and 30i in the Virtual Reality data packet is given an identification. A primary object 32 that appears in multiple proximity frames would be "cut out" from the rest of each frame, or the scene, and given a unique identification, and assigned a link, or a collection of links, to link to external data storage space that stores data associated with the object 32. The primary object 32 appearing on several proximity frames, such as from FIG. 3B—frame 30b through frame 30h, would be identified as one object, and given the same set of links.

Figure 3C:
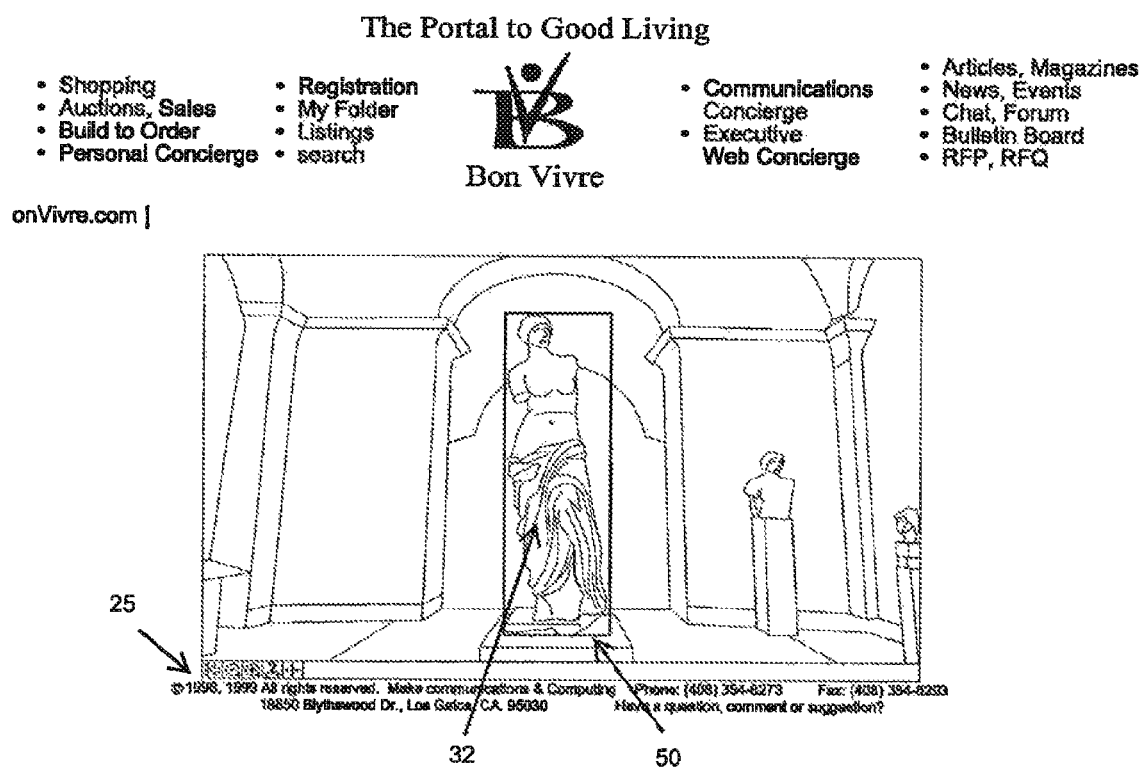
FIG. 3C illustrates a rectangular area closely surrounding the object that is cut, and marked out and identified separately from the rest of the picture/frame in accordance with the present invention.

A rectangular area 50 closely surrounding the object 32 in all of the proximity frames is cut as shown in FIG. 3C, and marked out and separated from the rest of the frame in order to be assigned a separate and unique identity to the object 32. This is done for frame 30b through frame 30h in FIG. 3B. The rectangular area 50 in all 7 frames 30b, 30c, 30d, 30e, 30f, 30g, and 30h are assigned the same identity representing the object 32, and the same links to the memory space external to the Virtual Reality Frames, containing the detailed information related to the object 32. Clicking within the rectangular area 50 in all 7 frames 30b, 30c, 30d, 30e, 30f, 30g and 30h results in linking to the same set of data.

Figure 3D:
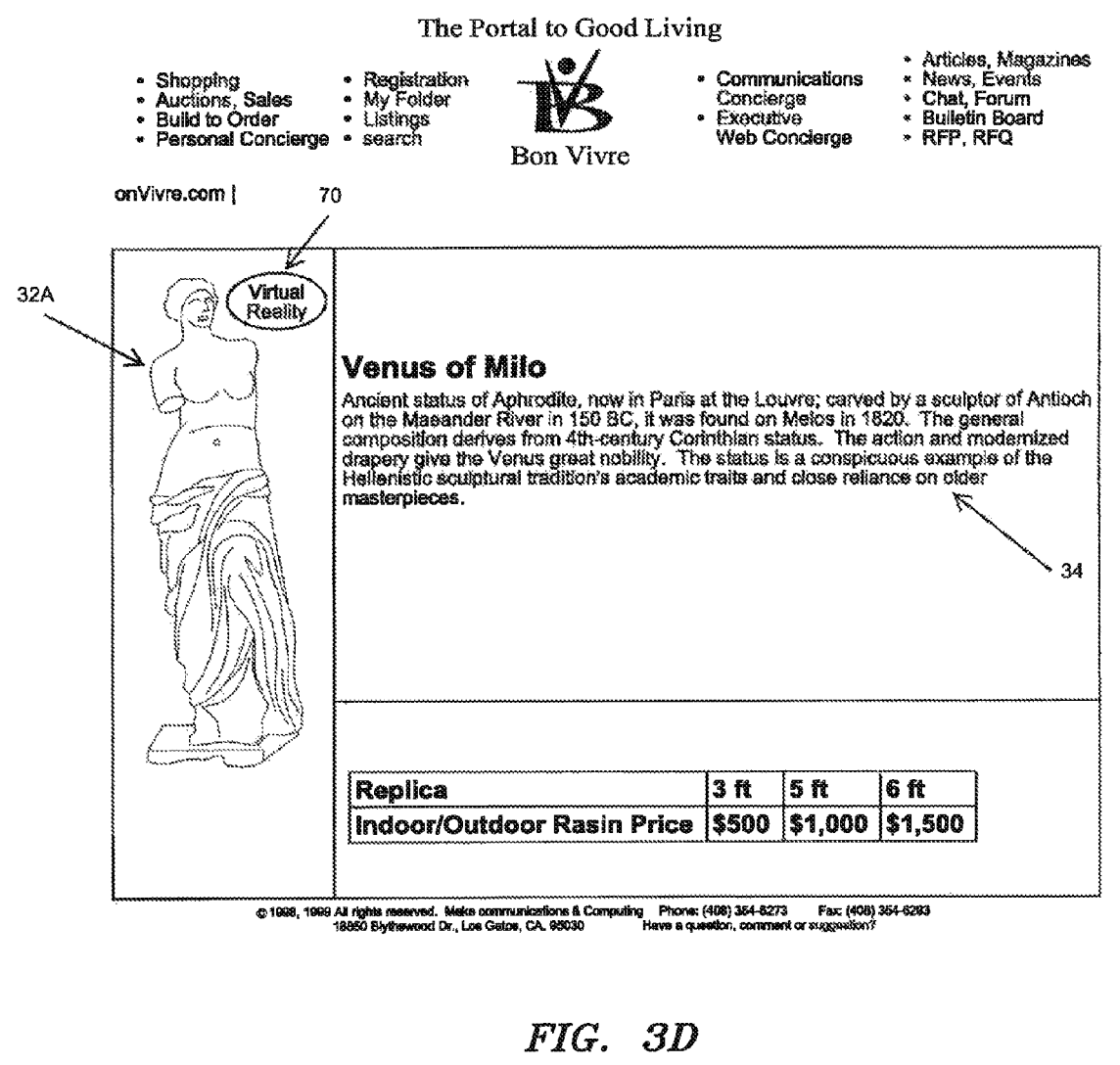

FIG. 3D shows frames, video, or VR can all be linked and called on demand. In this example, the enlarged still image 32A in FIG. 3D is further linked to another virtual Reality data packet that presents the object in 360-degree rotation.

Figure 3F:
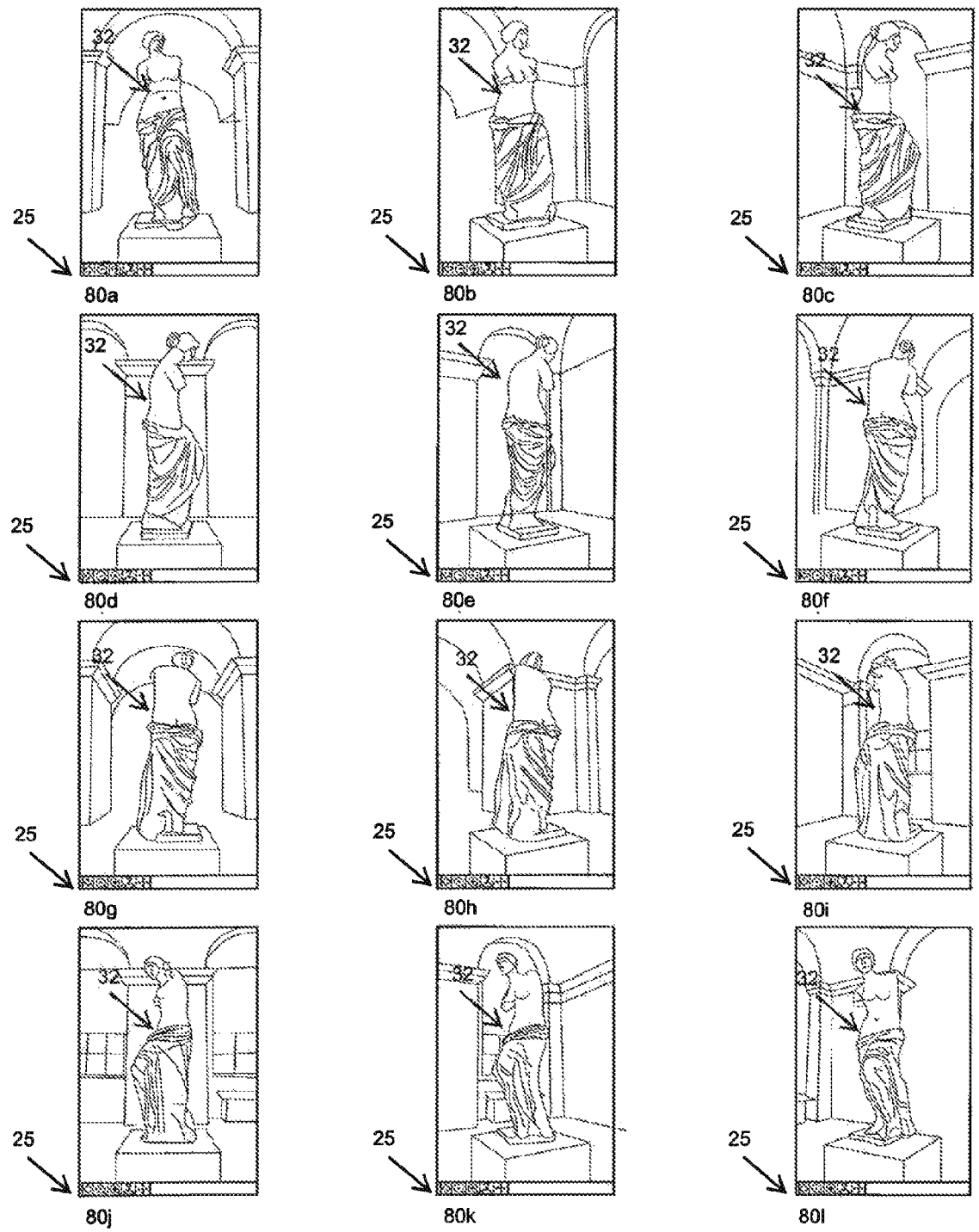
FIG. 3F illustrates 12 of the standard 36 frames shot form equally spaced angles 360-degrees around the object in accordance with the present invention.

Referring now to FIG. 3E, clicking the "Virtual Reality55 button 70 in FIG. 3D, brings the "rotating" Virtual Reality data packet of the object, with the control buttons 25 at the lower left corner. FIG. 3F shows the 12 of the standard 36 frames 80a, 80b, 80c, 80d, 80e, 80f, 80g, 80h, 80i, 80j, 80k and 80l shot from equally spaced angles, 360-degrees around the object. When the number of shots and the speed of sequentially "flashing in55 the still images into the viewing window are compatible, human eyes perceive that the object rotates on the viewing window. A larger number of shots would permit a smoother and slower rotation.

The invention enables practical and actionable commerce applications of Virtual Reality and Video casting or screaming technologies on the web, for example, in displaying objects in show rooms, galleries, stores, or stores in malls, shopping centers, or on main streets in a "real life55, in addition to conventional categorization, search, and listing presentations in the convention web stores and galleries. The current invention enables object images to be linked to additional textual, audio, graphical, video, or VR data stored in the database outside of the Virtual Reality or Video data packet. Clicking on the image of a sofa in such an "active Virtual Reality55 show room of this invention for example, of an interior furnishing show room, would deposit the links associated with the image to a temporary file. When the entire VR or Video presentation is viewed, and the selection of multiple interested objects shown in the VR presentation is completed, the collection of links of the objects selected is submitted to the server from the client/user computer, to retrieve data addressed by the submitted links, including but not limited to detailed audio or textual descriptions, additional graphics or VR presentations, pricing information and ordering/or buying submission mechanism, sorted and presented by each object at command.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A computer implemented method, comprising:
    displaying a virtual reality scene corresponding to a physical scene, wherein the virtual reality scene includes a plurality of objects, the plurality of objects being selectable by a user and being built from a plurality of images representing varied views of the plurality of objects in the physical scene;
    enabling the user to navigate within the virtual reality scene to observe the virtual reality scene from at least two perspectives;
    enabling the user to rotate at least one of the plurality of objects within the virtual reality scene about at least one axis;
    receiving from the user a selection corresponding to at least one of the plurality of objects within the virtual reality scene and, in response to the selection, displaying additional information about a selected at least one of the plurality of objects, wherein the additional information includes at least one of a link to buy and a link to bid on the selected at least one of the plurality of objects.

2. The computer implemented method of claim 1, wherein each of the plurality of images has a unique image address.

3. The computer implemented method of claim 1, wherein the additional information includes information related to a creator of the selected at least one of the plurality of objects digitally represented in the virtual reality scene.

4. The computer implemented method of claim 1, wherein the additional information includes a price of the selected at least one of the plurality of objects digitally represented in the virtual reality scene.

5. The computer implemented method of claim 1, wherein the additional information includes a present bid amount for the selected at least one of the plurality of objects digitally represented in the virtual reality scene.

6. The computer implemented method of claim 1, wherein the additional information includes digital representations of one or more objects created by a same creator of the selected at least one of the plurality of objects.

7. The computer implemented method of claim 1, wherein the selected at least one of the plurality of objects is indexed by an area that the representation of the selected at least one of the plurality of objects occupies in the virtual reality scene.

8. The computer implemented method of claim 1, wherein the user selects the selected at least one of the plurality of objects by indicating an area that the selected at least one object occupies, using an input mechanism.

9. The computer implemented method of claim 1, wherein the user selects the selected at least one of the plurality of objects by activating an input mechanism indicative of an area that the representation of the selected at least one object occupies.

10. The computer implemented method of claim 1, wherein the selected at least one of the plurality of objects corresponds to a digital representation of at least one of a painting, sculpture, photograph, furniture, tapestry and rug.

11. A system comprising:
    a computer readable storage medium capable of non-transitorily storing one or more programs configured for execution by one or more computer processors, wherein the one or more processors are communicatively coupled to a display device and a user input device, the display device being configured to be controlled by the one or more programs, the one or more programs comprising instructions that cause the one or more processors to:
    display on the display device a virtual reality scene corresponding to a physical scene, wherein the virtual reality scene exhibits a plurality of objects that are selectable by a user, and wherein the virtual scene is built from a plurality of images representing varied views of the physical scene and varied views of the plurality of objects;
    enable the user to navigate within the virtual reality scene and observe the virtual reality scene from one or more perspectives;
    enable the user to rotate at least one object within the virtual reality scene about at least one axis;
    receive from the user a selection corresponding to at least one of the plurality of objects within the virtual reality scene and;

display additional information about a selected at least one of the plurality of objects, wherein the additional information includes at least one of a link to buy and a link to bid on the selected at least one of the plurality of objects.

12. The system of claim 11, wherein each image has a unique image address.

13. The system of claim 11, wherein the additional information includes information related to a creator of the selected at least one of the plurality of objects digitally represented in the virtual reality scene.

14. The system of claim 11, wherein the additional information includes a price of the selected at least one of the plurality of objects digitally represented in the virtual reality scene.

15. The system of claim 11 wherein the additional information includes a present bid amount for the selected at least one of the plurality of objects digitally represented in the virtual reality scene.

16. The system of claim 11 wherein the additional information includes digital representations of one or more objects created by a same creator of the selected at least one of the plurality of objects.

17. The system of claim 11, wherein the selected at least one object is indexed by an area that the representation of the selected at least one object occupies in the virtual reality scene.

18. The system of claim 11, wherein the user selects the selected at least one object by indicating an area that the selected at least one object occupies, using an input device.

19. The system of claim 11, wherein the user selects the selected at least one object by activating an input mechanism indicative of an area that the representation of the selected at least one object occupies.

20. The system of claim 11, wherein the selected at least one object corresponds to a digital representation of at least one of a painting, sculpture, photograph, furniture, tapestry and rug.

* * * * *